March 4, 1941.                E. CARLSON                2,234,074
                         TURBINE GASOLINE ENGINE
                          Filed April 26, 1938           5 Sheets-Sheet 1

INVENTOR
Eric Carlson
BY
ATTORNEY

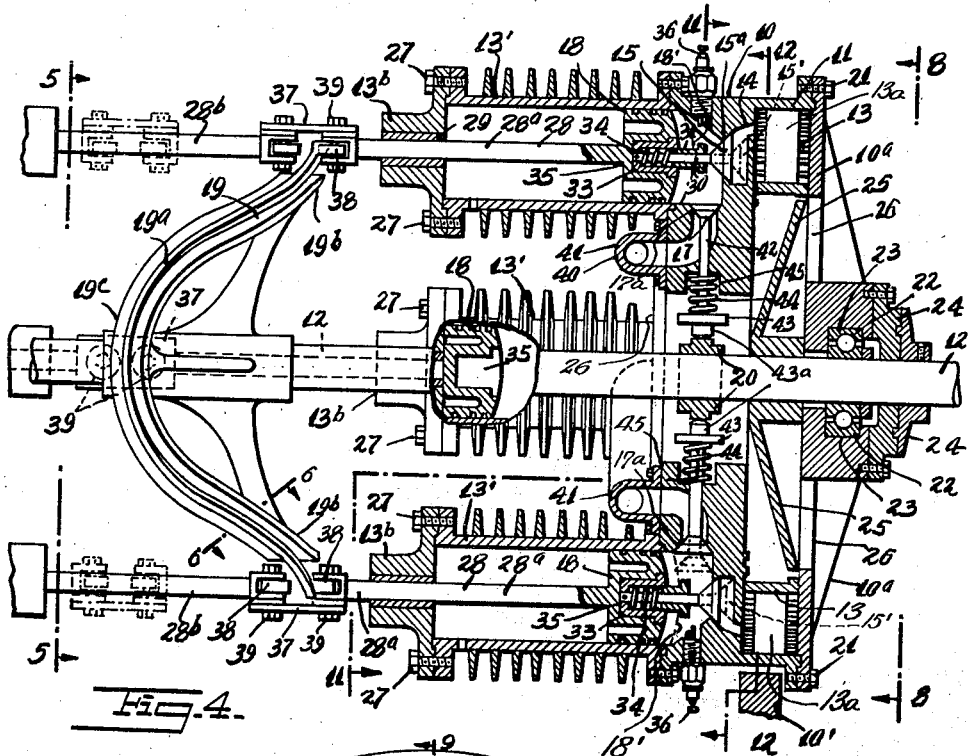
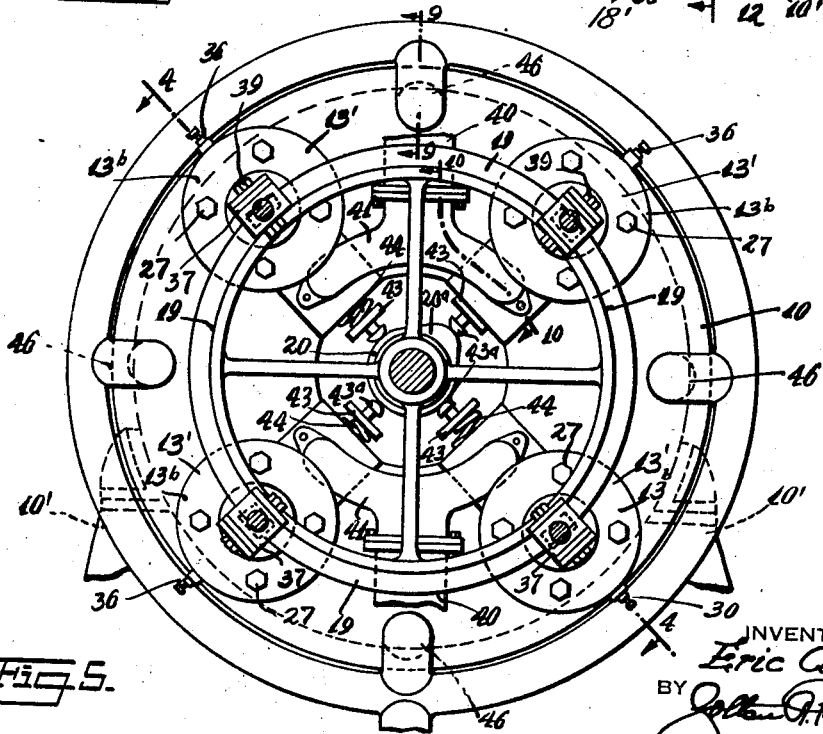

March 4, 1941.  E. CARLSON  2,234,074

TURBINE GASOLINE ENGINE

Filed April 26, 1938  5 Sheets-Sheet 3

INVENTOR
Eric Carlson
BY
ATTORNEY

March 4, 1941.  E. CARLSON  2,234,074

TURBINE GASOLINE ENGINE

Filed April 26, 1938  5 Sheets-Sheet 4

INVENTOR
*Eric Carlson*
BY
ATTORNEY

March 4, 1941.  E. CARLSON  2,234,074
TURBINE GASOLINE ENGINE
Filed April 26, 1938  5 Sheets-Sheet 5

INVENTOR
Eric Carlson
BY
ATTORNEY

Patented Mar. 4, 1941

2,234,074

UNITED STATES PATENT OFFICE 2,234,074

TURBINE GASOLINE ENGINE

Eric Carlson, Mount Vernon, N. Y.

Application April 26, 1938, Serial No. 204,484

2 Claims. (Cl. 60—13)

This invention relates to new and useful improvements in a turbine gas engine.

More specifically, the invention proposes a construction characterized in a casing having a circular rotor chamber within which a turbine rotor is rotatively supported and from which a plurality of compressor cylinders extend.

Still further it is proposed to provide the compressor cylinders with pistons adapted to compress gas entering through a manifold inlet so that when the gas is compressed and ignited the explosion will be directed against the buckets formed on the periphery of the rotor for rotating the same.

Still further it is proposed to mount the rotor upon a shaft which also has a cam for controlling the action of the pistons which have four movements, the same as conventional gas engines.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 4 is an elevational view partly in section of one unit constructed according to this invention.

Fig. 5 is a sectional view on the line 5—5 of Fig. 4.

Figure 1:
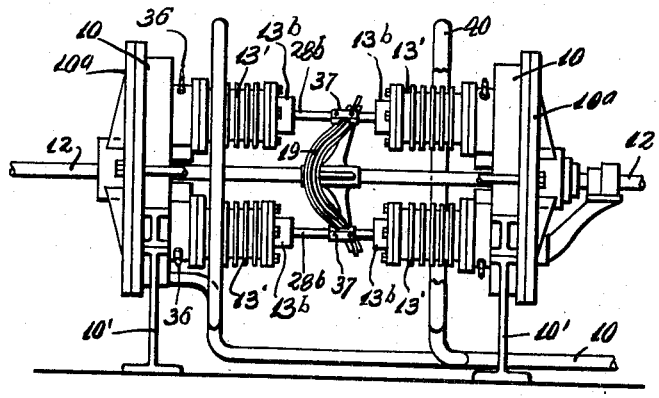
Fig. 1 is an elevational view of a turbine gas engine constructed according to this invention.

The turbine gas engine, according to this invention comprises a casing 10 having a circular rotor chamber 11. A shaft 12 is rotatively mounted coaxial with the circular chamber 11 and a turbine rotor 13 is fixedly mounted on the shaft 10 and has its peripheral area extending into the rotor chamber 11. A plurality of compressor cylinders 13' at points around the rotor chamber 11 each have a nozzle 14 for directing the gases against the rotor 13 for rotating the same. An exhaust valve 15 for each of the compressor cylinders 13' controls the gas passage connection of the cylinder with the nozzle 14. A gas manifold 40 supplies the gas to the compression cylinders 13'.

An inlet valve 17 for each compressor cylinder controls the gas passage connection with the gas manifold 40, and a compressor piston 18 is mounted in each cylinder 13'. A cam 19 is fixedly mounted on the shaft 12 and is connected with the pistons for causing two complete reciprocations of each piston for each complete rotation of the shaft 12. A cam 20 on the shaft 12 acts upon the inlet valves 17 for opening each valve for a short inlet period, once during each complete rotation of the shaft 12. Means controlled by each of the pistons opens its associated exhaust valve 15 each time the piston reaches its forward position.

The casing 10 is supported by brackets 10' and has a cover 10ᵃ held in position across the open end of the casing 10 by means of screws 21 and the inner wall of the cover 10ᵃ acts as one of the walls of the circular rotor chamber 11. At its center the cover 10ᵃ is provided with bearings 22 mounted within an opening 23 formed in an extended portion of the cover 10ᵃ. A second cover element 24 is fixedly attached to the cover 10ᵃ for holding the bearings 22 in position within the openings 23. The shaft 12 extends through the cover 10ᵃ and is supported by the bearings 22 for rotatively supporting the same.

The turbine rotor is fixedly attached to the shaft 12 and is provided with a plurality of buckets 13ᵃ against which the gases are adapted to be directed by the nozzles 14 for rotating this rotor, which in turn rotates the shaft 12. A portion of the rotor 13 towards the center thereof is provided with a plurality of fan blades 25. The casing 10 is provided with an opening 26 which continues through the cover 10ª for sucking the air through the openings in the cover and directing it against the compressor cylinders for cooling the same.

The compressor cylinders 13 extend from the side of the circular rotor chamber 11 and are enclosed at their outer ends by caps 13ᵇ fixedly attached to the body portion thereof by screws 27. The pistons 18 are attached to shafts 28 which slidably extend through openings 29 formed in the caps 13ᵇ of the compressor cylinders 13'. The exhaust valve 15 is adapted to cooperate with a complementary valve seat 15ª formed in the casing 10 in the vicinity of the nozzle 14 and when the valve element 15 is seated upon the valve seat 15ª the passage through the nozzle 14 will be closed so that any gases collecting within the compressor cylinders 13' will be compressed by the pistons 18 upon its forward movement.

Each valve 15 has an inwardly extending stem 30 which is provided with a collar 31 attached to a bar 32 extending across the inner end of the compressor cylinder 13'. A cup-shaped member 33 is fixedly attached to the end of the stem 30 and a spring 34 is coaxially mounted on the stem and operates between the bottom wall of the cup-shaped member 33 away from the collar 31 to seat the valve 15 on the valve seat 15ª. The spring 34 is of a strength sufficient to hold the valve 15 on its seat while the gas is being compressed in the cylinder and also while the explosion is taking place and until such time as the cam 19 moves the piston 18 to unseat the valve 15. The piston is formed with an opening 35 into which the cup-shaped member 33 is adapted to engage when this piston reaches its almost fully forward position (see Fig. 4). When the piston moves to the position shown by the dot and dash lines 18' in Fig. 4 it will compress the spring 34 to urge the collar 31 into the cup-shaped member 33 and cause the valve 15 to move to the dot and dash position 15', also in Fig. 4. When this valve reaches the dot and dash position it will be fully opened to permit gases from the cylinder compressor to be directed against the buckets 13ª formed upon the rotor 13. A spark plug 36 is mounted through the wall of the compressor cylinder near the completely extended position thereof for igniting the compressed gases when the piston reaches its fully extended position causing an explosion, the force of which will pass through the nozzle 14 and contact the buckets 13ª.

The movement of the piston 18 is controlled by the large cam which is mounted upon a portion of the shaft 12 and which is formed on its periphery with a track 19ª. The shaft 28 of the piston 18 is formed of separate sections. A section 28ª is provided with the piston 18 and the other section 28ᵇ is slidably supported upon a bracket or similar supporting element. The adjacent ends of the sections 28ª and 28ᵇ are fixedly connected together by a link 37. The shaft ends of the sections 28ª and 28ᵇ are bifurcated and rollers 38 are rotatively supported within the bifurcated ends and on shafts 39 extending between the arms of the bifurcated ends. These rollers 38 are adapted to engage on either side of the track elements 19ª so that when the cam 19 is rotated by the shaft 12 it will cause the piston 18 to reciprocate. The cam 19 is formed with two inwardly extending portions 19ᵇ, and two outwardly extending portions 19ᶜ to cause the piston 18 to make two complete compression strokes while the shaft 12 rotates once.

The gas manifold comprises a pipe 40 connected to a gas supply at one of its ends and which continues into branch lines 41 at the other of its ends. One of these branch lines 41 goes to each of the compressor cylinders. A means is provided for controlling the passage of the gas through this manifold to the compressor cylinder 13'. This means comprises a valve 17 adapted to engage a valve seat 17ª formed in the side wall of the compressor cylinder 13'. A stem 42 extends from the valve 17 through a portion of the branch line 41 and through the side wall of the casing 10. At its outer end the stem 42 is formed with a collar 43 having a rounded extension 43ª adapted to abut the cam 20 attached to the shaft 12.

A spring 44 operates between the collar 43 and the base wall of an opening 45 formed in the casing 10 for urging the valve 17 in position upon the valve seat 17ª to close the branch line 41 to prevent the gas from entering the compressor cylinder 13'. The cam 20 is formed with an outwardly extending portion 20ª which is adapted to engage against the extension 43ª for urging the stem 42 inwards against the action of the spring 44 to disengage the valve 17 from the valve seat 17ª to open the passage through the branch line 41 to supply gas to the compressor cylinder when the piston 18 moves away therefrom. This cam 20 is formed so as to open each of these latter-mentioned valves for a short inlet period once during each complete rotation of the shaft.

The casing 10 at points between the nozzles 14 is formed with exhaust openings 46 through which the gases are adapted to pass after they have acted upon the rotor 13.

Figure 2:
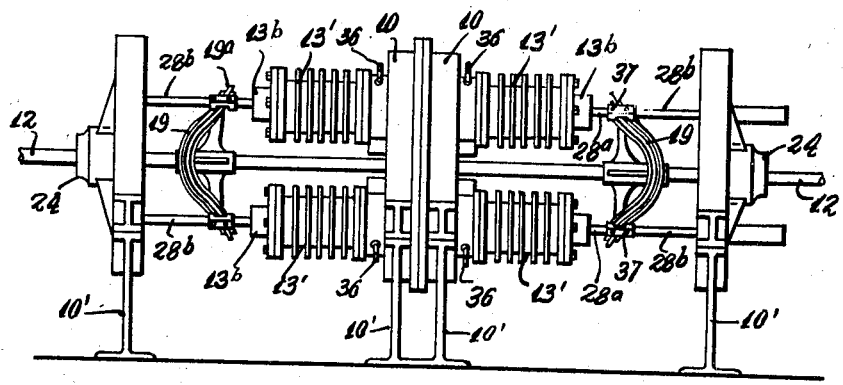
Fig. 2 is a view similar to Fig. 1 but illustrating a modification of the invention.
Figure 3:
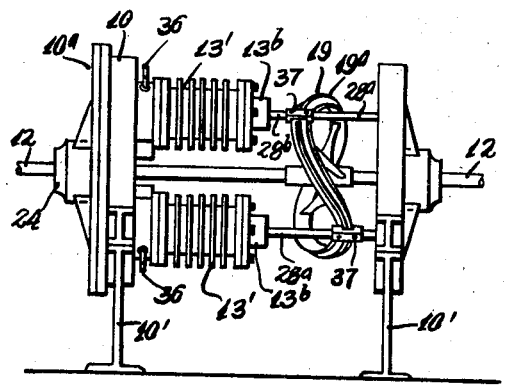
Fig. 3 is another view similar to Fig. 1 but illustrating a still further modification.
Figure 8:
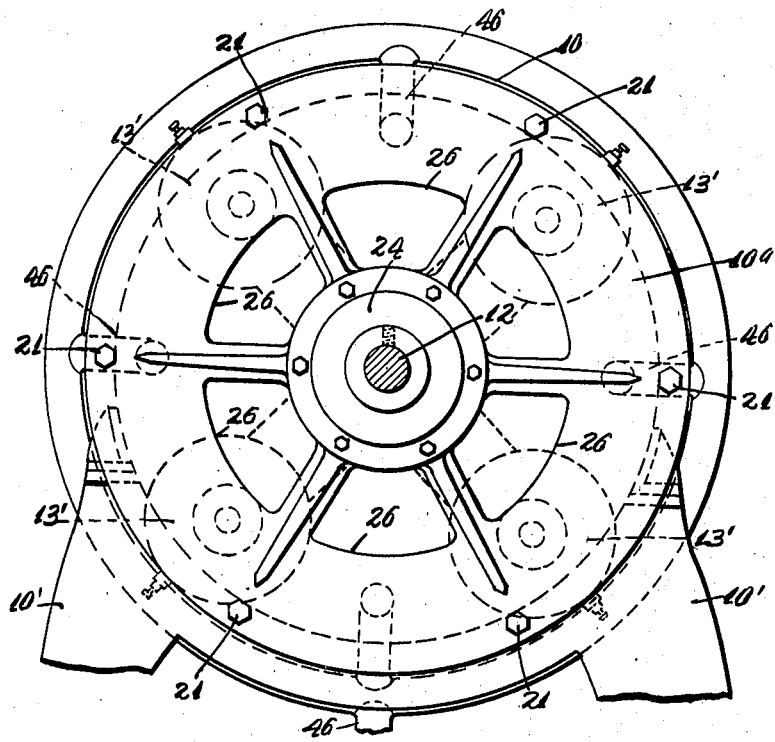
Fig. 8 is a view looking in the direction of the line 8—8 of Fig. 4.
Figure 6:
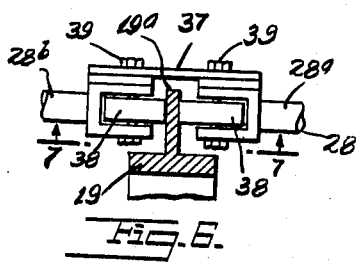
Fig. 6 is a sectional view on the line 6—6 of Fig. 4.
Figure 9:
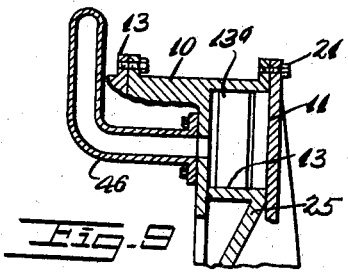
Fig. 9 is a sectional view on the line 9—9 of Fig. 5.
Figure 7:
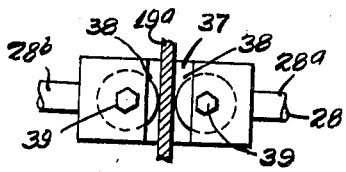
Fig. 7 is a sectional view on the line 7—7 of Fig. 6.
Figure 10:
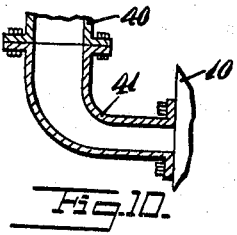
Fig. 10 is a sectional view on the line 10—10 of Fig. 5.
Figure 11:
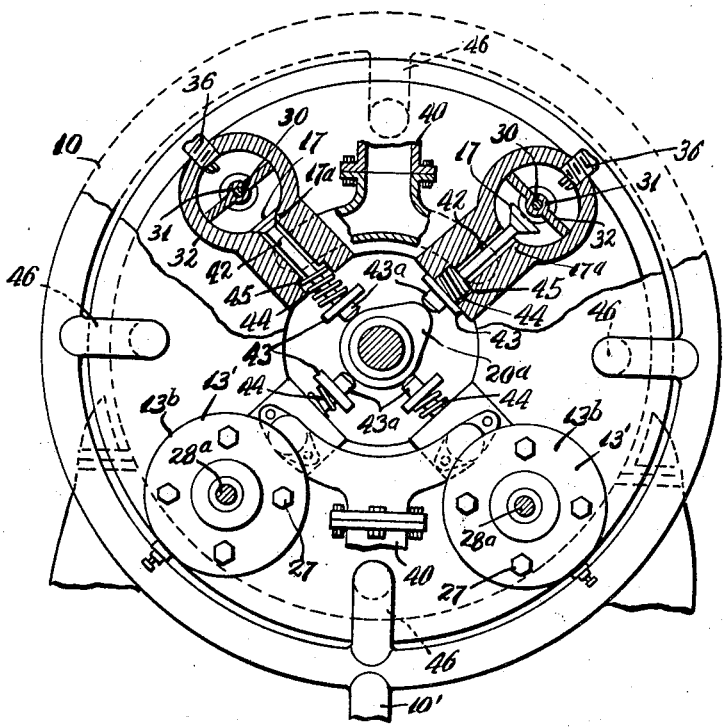
Fig. 11 is a sectional view on the line 11—11 of Fig. 4.
Figure 12:
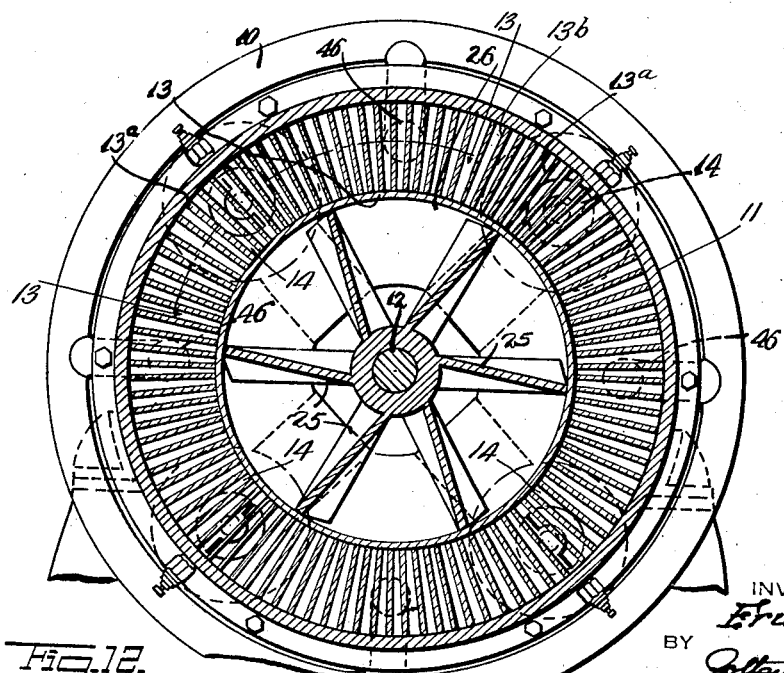
Fig. 12 is a sectional view on the line 12—12 of Fig. 4.

In Fig. 1 two units are shown connected together so as to be operated by means of one cam 19. In Fig. 2 one unit is shown set up for operation by one cam 19, and in Fig. 3 two units are shown set up in a manner to require two cams 19, one for operating each of the units.

Figure 14:
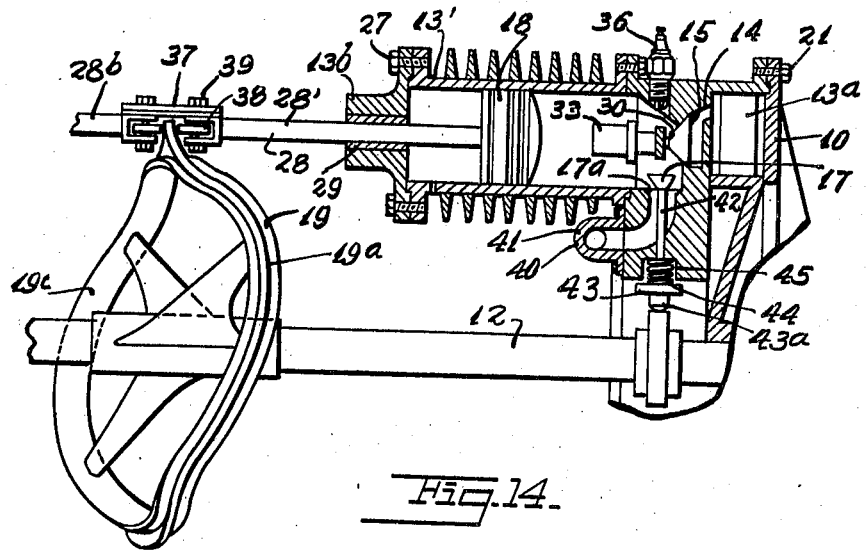
Fig. 14 is a view similar to a portion of Fig. 4 but illustrating the position of the valves when fuel is being sucked into the cylinder.
Figure 13:
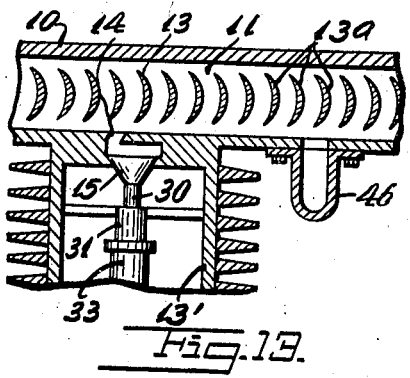
Fig. 13 is a horizontal sectional view on the line 13—13 of Fig. 12.
Figure 15:
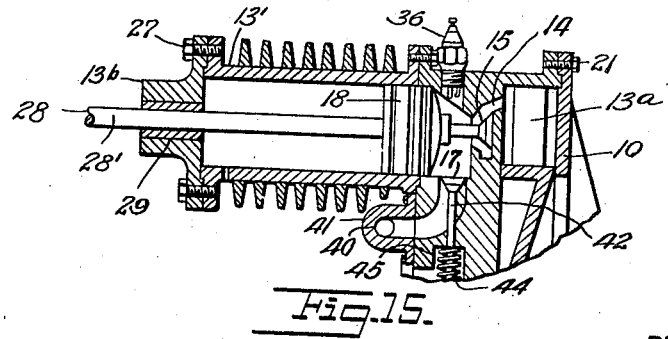
Fig. 15 is still another view similar to a portion of Fig. 4, but illustrating the position of the parts when the exhaust valve 15 is opened.

The operation of this device is as follows:

When the shaft 12 is rotated by the rotor 13 the cam 20 will rotate therewith until its extended portion 20ª acts against the extension 43ª formed on the collar 43 to urge the shaft 42 inwards against the holding action of the spring 44 to disengage the valve 17 from the valve seat 17ª to open the passage from the manifold 40 and the branch line 41 (see Fig. 14). While this valve is open the piston 18 moves from the position shown in Fig. 4 to an extreme rearward position to suck gases from the manifold 40 to the compressor cylinder 31.

When the piston 18 reaches its extreme rear position the cam 20 will have been rotated sufficiently by the shaft 12 to disengage the portion 20ª from the extension 43ª to permit the spring 44 to again engage the valve 17 upon the valve seat 17ª to close the branch 41. The piston 18 will then move forward to compress the gases within the compression cylinder, and when it reaches the position shown in full lines in Fig. 4, the gases will be completely compressed. Energy will then be supplied to the spark plug 36 for purposes of igniting the compressed gases within the cylinder 13'. At the same time that the gas is being ignited the piston 18 will be moved further forward for engaging the cup-shaped member 33 within the opening 35 formed in the piston 18 so that any further movement of the piston 18 will cause the cup-shaped member 33 to compress the spring 34 and move the stem 30 to disengage the valve 15 from the valve seat 15ª illustrated by the dot and dash lines 15' in Fig. 4.

When the valve 15 is completely open, the force of the explosion created by the ignited gases will pass through the nozzles 14 and against the buckets 13ª formed on the rotor 13, for purposes of rotating the rotor which in turn will cause the shaft 12 to be rotated. Further rotation of the shaft 12 will rotate the large cam 19 to again move the piston 18 rearwards to seat the valve 15 upon the valve seat 15ª to close the passage through the nozzle 14.

When the piston 18 reaches its fully rear position, it will again be moved forward by the cam 19 to open the valve 15 and force any remaining burned gases to pass through the nozzle 14 and against the buckets 13ª. As the gases reach a position adjacent the exhaust openings 46 the gases will pass therethrough and discharge into the atmosphere. Upon the next rearward motion of the piston 18, the valve 17 will again be opened by the cam 20 to cause the piston 18 to suck the gases into the compression cylinder from the manifold 40 and again complete the cycle described above.

While I have shown the casing provided with four compression cylinders, to each rotor 13, this casing may also be provided with any number of additional compressor cylinders and other changes may be made without materially departing from the scope of the invention defined in the appended claims.

Having thus described my invention, what I claim as new, and desire to secure by United States Letters Patent is:

1. In a device of the class described, a casing having a circular rotor chamber, a rotor rotatively supported axially of said casing, buckets mounted on the peripheral edge of said rotor and extending into said rotor chamber, a cylinder mounted on said casing adjacent the peripheral edge thereof and having an inlet for fuel, a nozzle connecting the interior of said cylinder to said rotor chamber, a piston slidably engaged into said cylinder, means for reciprocating said piston, a valve seat formed on the end of said nozzle adjacent said cylinder, a valve engaging said seat for closing said nozzle, a stem extending from said valve into said cylinder, resilient means for holding said valve in position on said seat, a rod extended across the end of said cylinder, a collar mounted on said rod and through which said stem freely passes, a cup-shaped member mounted on the inner end of said stem and engageable into said recess formed in said piston when said piston almost reaches the end of its stroke, means for simultaneously igniting the compressed fuel contained in said cylinder so that further movement of said piston towards the end of said cylinder will cause said stem to be extended from said cylinder to unseat said valve so that the burned gases resulting from said ignition will pass from said cylinder through said nozzle and into said rotor chamber and against said buckets to rotate said rotor.

2. In a device of the class described, a casing having a circular rotor chamber, a rotor rotatively supported axially of said casing, buckets mounted on the peripheral edge of said rotor and extending into said rotor chamber, a cylinder mounted on said casing adjacent the peripheral edge thereof and having an inlet for fuel, a nozzle connecting the interior of said cylinder to said rotor chamber, a piston slidably engaged into said cylinder and having a recess formed in the head thereof and arranged to suck fuel into said cylinder through said inlet to be compressed when said piston moves towards the end of said cylinder having said nozzle, means for reciprocating said piston, a valve seat formed on the end of said nozzle adjacent said cylinder, a valve engaging said seat for closing said nozzle, a stem extending from said valve into said cylinder, resilient means for holding said valve in position on said seat, a rod extended across the end of said cylinder, a collar mounted on said rod and through which said stem freely passes, a cup-shaped member mounted on the inner end of said stem and engageable into said recess formed in said piston when said piston almost reaches the end of its stroke, means for simultaneously igniting the compressed fuel contained in said cylinder so that further movement of said piston towards the end of said cylinder will cause said stem to be extended from said cylinder to unseat said valve so that the burned gases resulting from said ignition will pass from said cylinder through said nozzle and into said rotor chamber and against said buckets to rotate said rotor, said resilient means comprising a spring coaxially mounted upon the inner end of said stem and operative between said collar and said cup-shaped member.

ERIC CARLSON.